United States Patent [19]
Gutleber

[11] Patent Number: 4,617,570
[45] Date of Patent: Oct. 14, 1986

[54] INTERFERENCE CANCELLING RECEIVER HAVING HIGH ANGULAR RESOLUTION INTERCEPT OF TRANSMITTED RADIATORS

[76] Inventor: Frank S. Gutleber, 24 Carriage House La., Little Silver, N.J. 07739

[21] Appl. No.: 526,848
[22] Filed: Aug. 26, 1983
[51] Int. Cl.$^4$ .............................................. G01S 5/02
[52] U.S. Cl. .................................... 342/429; 342/367
[58] Field of Search .............................. 343/379–384, 343/367, 429, 16 R; 455/283

[56] References Cited
U.S. PATENT DOCUMENTS

| | | | |
|---|---|---|---|
| 3,290,684 | 12/1966 | Renn et al. ............................ | 343/381 |
| 3,710,384 | 1/1973 | Ashcraft ........................ | 343/16 R X |
| 4,275,397 | 6/1981 | Gutleber ............................ | 343/381 |

Primary Examiner—Thomas H. Tarcza
Assistant Examiner—Mark Hellner

[57] ABSTRACT

A swept interference canceller including a multiplexed interference cancelling receiver coupled to a scanned notch antenna and an omni-directional antenna as well as an estimator type of angular beam splitting system for accurately measuring angular bearing of a plurality of sequentially received radiating sources in a dense communication environment. A difference signal between the signals received by the two antennas is developed which is then split into a plurality of equal time samples which are then simultaneously fed into two synchronous multi-stage shift registers. The output stages of one of the shift registers operate so that they all have the same output states. The output stages of the other shift register, however, operate so that the first half have the same output state as the first shift register while the second half are of the opposite output state. The outputs from the two shift registers are summed and fed to a logic gate which operates to generate an output signal following the occurrence of the middle time sample which is a time corresponding to the position of the boresight axis of the signal received from a radiating source.

13 Claims, 3 Drawing Figures

INTERFERENCE CANCELLING RECEIVER HAVING HIGH ANGULAR RESOLUTION INTERCEPT OF TRANSMITTED RADIATORS

The invention described herein may be manufactured, used and licensed by or for the Government for governmental purposes without the payment of any royalties thereon or therefor.

CROSS REFERENCE TO RELATED APPLICATION

This invention is related to application U.S. Ser. No. 517,191 entitled, "Interference Cancelling Transmitter", filed in the name of Frank S. Gutleber, the present inventor, on July 25, 1983.

FIELD OF THE INVENTION

This invention relates generally to communications systems and more particularly to tactical intercept systems such as Direction Finding (DF) receivers.

BACKGROUND OF THE INVENTION

As is well known and understood, one of the major concerns of designers of antenna system communications links is the elimination or reduction of external interference sources such as jamming, self-interference, atmospheric noise and man made noise. As is well known, most arrangements which attempt to resolve these problems of external interference do so in a relatively complex manner, often utilizing very large directional antennas and/or with antennas having hundreds or more elements. This problem of external interference is particularly prevalent in the area of mobile communications systems where omnidirectional antennas are employed because of the large number of users operating in the same frequency band and because of multipath. Use of very large directional antennas in mobile communications, moreover, is almost physically impossible and economically impractical.

A new concept for eliminating interference in a communications system utilizing a plurality of transmission links is shown and described in U.S. Pat. No. 4,275,397, entitled, "Interference Cancelling Random Access Discrete Address Multiple Access System", which issued to Frank S. Gutleber, the present inventor, on June 23, 1981. The system disclosed therein utilizes orthogonal multiplexing in conjunction with a receiver antenna configuration comprised of an omnidirectional antenna and a notch antenna at a receiving end of the transmission link to cancel interference arriving from all directions except over the narrow beamwidth notch or null formed by the notch antenna.

In the above referenced related application, there is shown and disclosed a transmitter for use in mobile subscriber multiple access system where the power output of the communications transmitter is fed to both an omnidirectional antenna and a notch antenna having a single null over a small angular beamwidth with the combination developing a relatively narrow beam of radiation at the location of the null. By rotating the notched antenna or electronically scanning it, the notch and accordingly the narrow beam of radiation can be pointed in the direction of the desired signal.

Accordingly, it is an object of the present invention to improve the angular orientation of an antenna system at the receiving end of a transmission link to eliminate external interference which thereby provides a high degree of angular resolution and facilitates intercept.

Another object of the invention is to provide an accurate measurement of the angular bearing of received radiation from a plurality of discrete radiating sources.

Still a further object of the invention is to provide a means of achieving exceptionally fine angular resolution of antenna direction toward one or more radiating sources in a dense communications environment.

And yet another object of the invention is to provide accurate angular direction finding (D.F.) of received radiation from a large quantity of radiating sources by sweeping a received radiation pattern having a narrow beamwidth portion which sequentially isolates each radiating source located in a dense communications environment.

SUMMARY OF THE INVENTION

These and other objects are achieved by means of a multiplexed interference cancelling receiver coupled to a scanned notch antenna and an omnidirectional antenna with the angular bearing of at least one of a plurality of radiating transmitters being determined by an estimator type of angular beam splitting control system which is responsive to transmitted radiation received from a remote source and operates to provide an indication of the center of a received radiation pattern that corresponds to the boresight axis of the transmitted radiation. This system is particularly useful where a plurality of transmitters are operating in a dense communications environment.

DESCRIPTION OF THE PREFERRED EMBODIMENT

Figure 1:
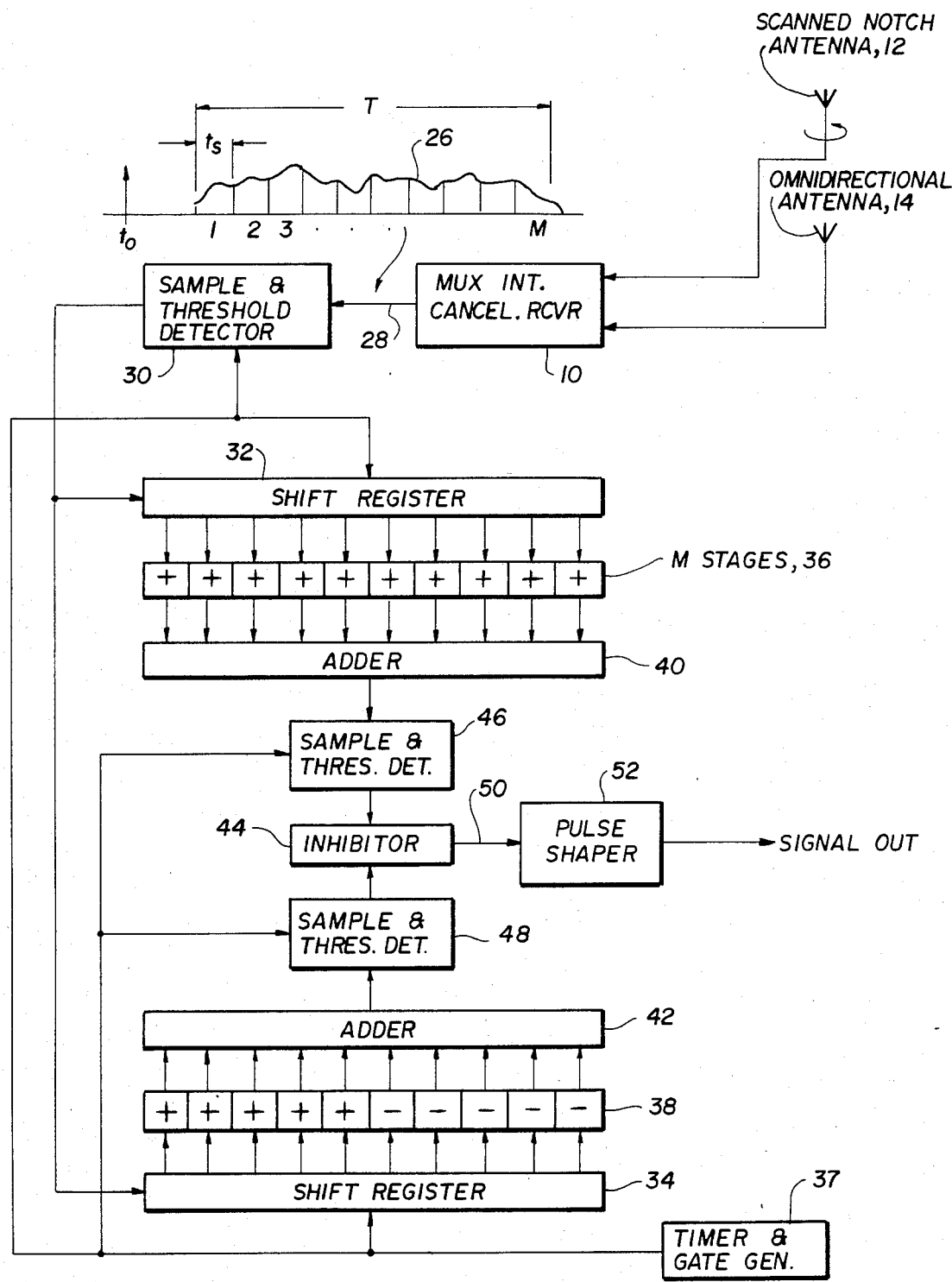
FIG. 1 is a functional block diagram illustrative of receiver apparatus including an angular beam splitting control system in accordance with the principles of this invention.

Referring now to the drawings and more particularly to FIG. 1, reference numeral 10 denotes a multiplexed interference cancelling receiver, a typical example of which is shown and described in the above referenced U.S. Pat. No. 4,275,397. The receiver 10, moreover, is shown coupled to a notch antenna 12 and an omnidirectional antenna 14. The notch antenna 12 furthermore is physically or electronically scanned with the notch pointing in the direction of a desired signal. As taught in U.S. Pat. No. 4,275,397, the receiver 10 operates in conjunction with the two antennas 12 and 14 to cancel interference arriving from all directions except over the relatively small angular sector or beamwidth of the notch antenna 12. As is well known, the notch is formed by designing a single null of a relatively steep slope into the antenna pattern while providing uniform reception in all other directions. This can be accomplished with relatively simple antennas such as disclosed in the present inventor's U.S. Pat. Nos. 3,130,410, and 3,605,106, which make it idealy suited for application at frequencies in the HF, VHF, or UHF frequency bands which are used in tactical, highly mobile systems such as a mobile subscriber multiple access communications system.

The high degree of angular resolution obtained using a multiplexed interference cancelling receiver in conjunction with a notch antenna and an omnidirectional antenna is used to accurately determine the angular bearing of each of a plurality of received radiating sources by electronically or mechanically scanning the notch antenna 12 to sequentially isolate each radiating source in a dense communications environment. This is shown, moreover, by the illustration of FIG. 2 wherein reference numeral 16 designates a fixed pattern which provides uniform reception in all directions and is provided by the omnidirectional antenna 14 while reference numeral 18 denotes the pattern formed by the notch antenna 12, which pattern is omnidirectional except for the location of the notch or null 20. Further as shown, the notch is rotated clockwise at an angular speed $\omega$ to sequentially receive signals from a plurality of transmitting sources $T_1$, $T_2$, $T_3$ and $T_n$.

Figure 2:
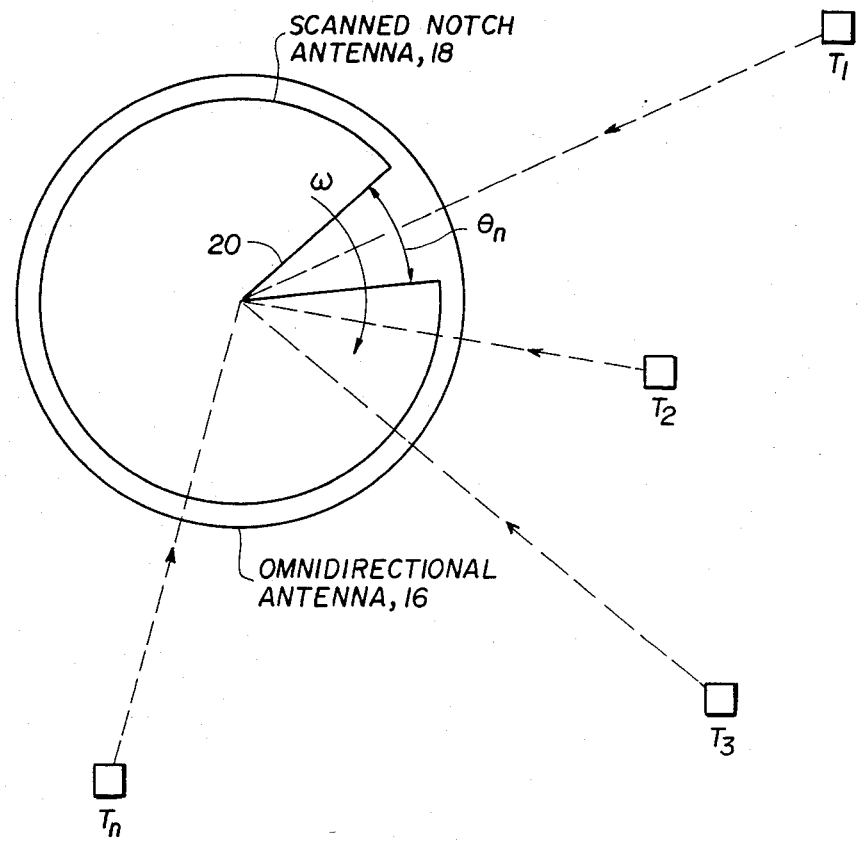
FIG. 2 is a diagram representing the resulting receiver beam pattern achieved by an omnidirectional antenna utilized together with a scanned notch antenna.

In order to accurately measure the bearing of each of the transmitting sources $T_1 \ldots T_n$, an estimator type of angular splitting system is shown in FIG. 1 which is capable of realizing a lower bound on angular accuracy and which is as good as would be theoretically possible for a large complex narrow beam antenna whose beamwidth is equal to that of the notch formed with the notch antenna. As shown in FIG. 1, an antenna pattern subtraction process occurs in the multiplexed interference cancelling receiver which is coupled to the notch antenna 12 and the omnidirectional antenna 14 and provides an RF output corresponding to the incident radiation at the location of the notch 20 (FIG. 2). The output of the multiplexed interference cancelling receiver 10 comprises a video signal 26 having a signal width of T on the circuit lead 28. The video signal 26 is fed to a time sampler and threshold detector 30 which operates to split the video signal 26 into M samples or pulses of equal time duration or pulse width $t_s$. The threshold detector portion of the block 30 is for purposes of providing outputs of M consecutive pulse signal samples whose amplitudes exceed a predetermined signal level for eliminating undesired signals such as noise. The M samples out of the sample and threshold detector 30 are fed in parallel to two shift registers 32 and 34 under the control of a timer and gate generator 37. The M samples are further loaded into the shift registers 32 and 34 by being synchronously clocked into M stages thereof by the timer and gate generator 37. The shift registers 32 and 34 have a number of stages at least equal to the number of samples into which the received video signal 26 is split. The shift register 32 includes M output stages 36 having the same output state (+) whereas the shift register 34 includes M output stages 38, the first half of which have the same output state (+) as the output stages 36 while the second half are of the opposite output state (−). The M output stages 36 and 38 of the shift registers 32 and 34 are fed to respective linear adders 40 and 42 where the samples are summed and applied to an inhibitor gate 44 via respective sample and threshold detectors 46 and 48 which are controlled by the timer and gate generator 37.

In such a configuration, the inhibitor gate 44 will provide an output pulse following the occurrence of the middle pulse or M-M/2 sample where the output states of the output stages 38 of shift register 34 reverse and which is a time corresponding to the center of the notch or null of the notched antenna 12, since the timer and gate generator 37 act to synchronize the relative time to the position of the boresight axis of the notched beamwidth pattern. A pulse shaper 52 is further shown in FIG. 1 coupled to the output of the inhibitor gate 44 for providing an output signal of a predetermined type to provide an accurate measurement of the angular bearing, compared to preestablished compass reference bearing of the boresight axis of each radiating source coming within the beamwidth of the notch 20 shown in FIG. 2.

The summed output from the adder 40 of the first shift register 32 is equivalent to a matched filter detector and weighting could be used on the separate output stages 36 if desired to achieve a better match. The second shift register 34 performs a function that is equivalent to forming a split gate such as utilized in a range tracking radar system. Weighting can also be applied in connection with the output stages 38 of shift register 34 to reflect an improvement in performance; however, it is not necessary for the basic concept in its implementation.

The angular measurement accuracy that is obtained with the system shown in FIG. 1 is dictated only by the beamwidth $\theta_n$ of the notch 20 shown in FIG. 2 and the ratio of the output signal energy E to the noise power density $N_o$, i.e. $E/N_o$. The rms angular measurement error for the beam splitting system, furthermore, can be derived in terms of the received IF signal power $S_i$ and the IF input noise $N_i$. Since the summed output signal of the shift registers 32 and 34 are correlated, the peak output signal voltage of the second shift register 34 will be $M/2\sqrt{S_i}$. Also since the noise at the various stages of the shift register 34 are uncorrelated due to the fact that the sampling period $t_s$ is $\geq$ the reciprocal of the input signal spectrum T, the output noise voltage will be $\sqrt{M} \times \sqrt{N_i}$ since it will increase in an rms fashion.

Figure 3:
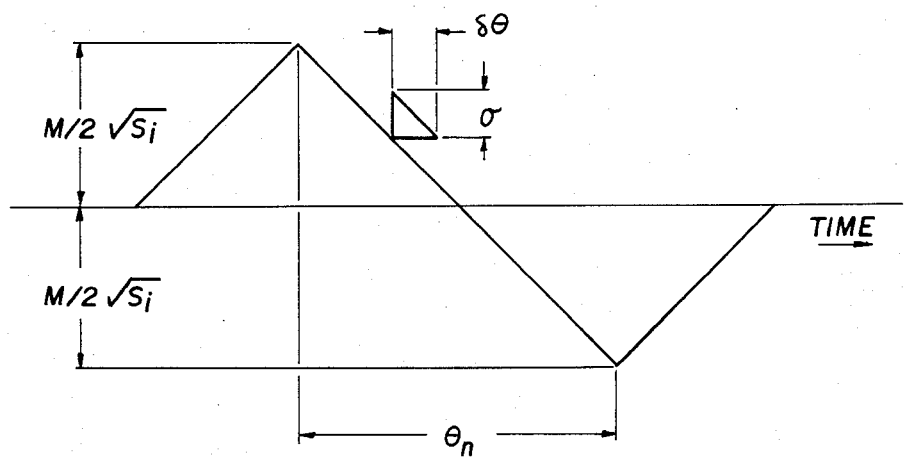
FIG. 3 is a diagram helpful in providing an understanding of the angular measurement accuracy achieved in accordance with the embodiment of the invention shown in FIG. 1.

Referring now to FIG. 3, there is shown an output timing diagram of the second shift register 34 in terms of the system parameters, where, for example, $\theta_n$ is the width of the input signal and which corresponds to the beamwidth of the notch 20 shown in FIG. 2, $\sigma$ is the output rms noise voltage which can be expressed as $\sqrt{MN_i}$, $M/2\sqrt{S_i}$ is the output signal voltage as noted above, and $\delta\theta$ is the output rms angular error.

The rms output angular error $\delta\theta$ can be developed relative to the output rms noise amplitude $\sigma$, the notch beamwidth $\theta_n$ and the peak output signal voltage $M/2\sqrt{S_i}$ from the geometry of the phase shift register output characteristic shown in FIG. 3 as follows: by inspection, $$\delta\theta/\sigma = \theta_n/M\sqrt{S_i} \quad (1)$$

And since $$\sigma = MN_i \quad (2)$$

then, $$\delta\theta = \theta_n / \sqrt{M\left(\frac{S_i}{N_i}\right)} \quad (3)$$

Equation (3) is the desired result and establishes the fact that the proposed approach realizes the lower bound possible for angular accuracy which can theoretically be achieved.

It can further be shown that the lower bound of a regular, unbiased angle estimate "$\delta_{min}$" can be expressed as:

$$\delta_{min} = 1.06\theta_g / \sqrt{M\left(\frac{S_i}{N_i}\right)} \quad (4)$$

which is obtained with a maximum likelihood estimator.

For completeness, equation (3) may now be expressed in terms of the signal energy E and noise power density $N_o$ as follows:
Since $$E/N_o = S'_i t_s M/N_o \quad (5)$$

where $S'_i$ is the received rms signal power, $t_s$ is the sampled pulsewidth, M is the number of pulses integrated, $N_o$ is the noise power density, E is the received signal energy.

With respect to the term $S'_i$, $$S'_i = S_i/2 \quad (6)$$

where $S_i$ is the peak signal power.

With respect to the term $N_i$, $$N_i = N_o (1/t_s) \quad (7)$$

Combining equations (5), (6) and (7) there results the following:

$$MS_i/N_i = 2E/N_o \quad (8)$$

which when substituted into equation (3) yields, $$\delta\theta = \theta_n / \sqrt{\frac{2E}{N_o}} \quad (9)$$

The derivation of equations (3) and (9) tacitly assumes that the shift register performed as a tapped delay line and that the signal and noise levels combined in a linear analog fashion. This facilitates deriving a simple heuristic performance equation without accounting for the quantizing effect introduced when employing a non-linear shift register as a quasi matched filter type of processor. Where M is a relatively large number the quantized angular estimate would approach very closely the error given by equations (3) or (9).

To be effective, the notch antenna 12 needs a slope in the pattern developed at the point of the null to be as steep a slope as is practical. General design procedures for providing an array antenna having this type of characteristic are described not only in U.S. Pat. No. 3,130,410 and 3,605,106, but also in copending application Ser. No. 533,089 filed Sept. 19, 1983 by the instant invention and in an article entitled, "Coded Linear Array Antenna" published in volume 39, No. 2 of *Electrical Communications Magazine*. As noted therein, such patterns are made up of products and/or sums of $$\left[\frac{\sin mx}{\sin x}\right]$$

functions and can be achieved by controlling both amplitudes and spacings of array antenna elements. As a result, the slope of the null in an antenna beam pattern can be made steep either by providing one or more $$\left[\frac{\sin mx}{\sin x}\right]^y$$

terms or by appropriate amplitude and phase control when summing several $$\left[\frac{\sin mx}{\sin x}\right]$$

functions using subarrays.

Thus what has been shown and described is a high angular resolution antenna system for isolating individual radiating sources in a dense communications environment and obtaining accurate angular measurements of their directions.

Having thus shown and described what is at present considered to be the preferred embodiment of the invention, it will be readily apparent that modifications may be resorted to by those skilled in the art without departing from the spirit and scope of the invention. Accordingly, all alterations, changes and substitutions coming within the scope of the present invention as set forth in the appended claims are herein meant to be included.

I claim:

1. Receiver apparatus in a multiple access signal communications system including one or more transmitters, comprising in combination:
    first antenna means having an omnidirectional antenna beam pattern;
    second antenna means having a generally omnidirectional antenna pattern with a single notched portion;
    means for scanning said second antenna means to position said notched portion in the direction of said one or more transmitters;
    means, responsive to RF signals received by said first and second antenna means, for determining the center of a transmitted radiation pattern from said one or more transmitters for providing an indication of the bearing of said transmitters relative to said receiver apparatus including means for generating a difference RF signal between said RF signals received by said first and second antenna means, means responsive to said difference RF signal for providing a video signal therefrom, means for splitting said video signal into a plurality of pulse signal samples of substantially equal pulse width; and
    means for determining the pulse signal sample substantially at the mid-point of said plurality of signal samples which thereby indicates the direction of the said transmitted radiation including first means for storing said plurality of pulse signal samples in a predetermined signal state, second means for storing said plurality of pulse signal samples and inverting the signal state of one half of said signal samples to a state opposite from said predetermined signal state, and means for determining the occurrence of the inverted one half signal samples stored in said second means relative to the plurality of pulse signal samples stored in said first means, said occurrence providing an indication of the boresight axis of said transmitted radiation pattern.

2. The combination of claim 1 wherein said notched portion comprises a relatively steep slope beam pattern null.

3. The combination of claim 1 wherein said first means for storing said plurality of pulse signal samples comprises a shift register having a plurality of stages at least equal in number to said plurality of pulse signal samples and having a respective number of output stages of the same operative state, and wherein said second means for storing said plurality of pulse samples comprises a shift register having a plurality of output stages also at least equal to the number of said pulse signal samples and having a respective number of output stages the second half of which have an operative output state opposite to the operative output stage of the first half of output stages.

4. The combination of claim 3 wherein said determining means additionally includes first signal summing means coupled to said plurality of output stages of said first means for storing, second signal summing means coupled to said output stages of said second means for storing, and logic gate coupled to said first and second summing means and being operative to output a pulse at the occurrence of the inverted one half signal samples stored in said second shift register.

5. The combination of claim 4 wherein said first and second summing means comprises first and second linear adder means.

6. The combination of claim 5 and additionally including first and second signal sampling means respectively coupled between said first and second adder means and said logic gate.

7. The combination of claim 6 wherein said logic gate comprises an inhibitor logic gate.

8. The combination of claim 7 and additionally including first and second threshold detector means respectively coupled between said first and second adder means and said inhibitor logic gate.

9. A method of intercepting and determining the location of one or more radiating sources in a dense communications environment comprising the steps of:

receiving signals from said radiating sources by first antenna means having an omnidirectional antenna beam pattern;

receiving signals from said radiating sources by second antenna means having a generally omnidirectional antenna pattern with a single notched portion;

scanning said second antenna means to position said notched portion in the direction of said one or more transmitters; and generating a difference signal between said signals received by said first and second antenna means, generating a video signal from said difference signal, splitting said video signal into a plurality of pulse signal samples of substantially equal pulse width, and determining the pulse signal sample substantially at the mid-point of said plurality of signal samples which thereby indicates the direction of the said transmitted radiation including storing said plurality of pulse signal samples in a predetermined signal state in first storage means, storing said plurality of pulse signal samples in second storage means and inverting the signal state of one half of said signal samples therein to a state opposite from said predetermined signal state and determining the occurrence of the inverted one half signal samples stored in said second means relative to the plurality of pulse signal samples stored in said first means, said occurrence providing an indication of the boresight axis of said transmitted radiation pattern.

10. The method of claim 9 wherein said first and second storage means comprise first and second shift registers having a plurality of stages at least equal in number to said plurality of pulse signal samples.

11. The method of claim 9 and wherein said determining step comprises sampling and summing the pulse signal samples stored in said first and second storage means, and generating an output pulse at the occurrence of the first of said inverted one half signal samples stored in said second storage means.

12. The method of claim 11 wherein said determining step additionally includes the step of threshold detecting the summed signal samples prior to generating said output pulse.

13. The method of claim 12 wherein said output pulse generating step comprises generating said output pulse with an inhibitor logic gate which is responsive to the threshold detected summed signal samples.

* * * * *